United States Patent
Toebben

[19]

[11] Patent Number: 6,138,553
[45] Date of Patent: Oct. 31, 2000

[54] ROTARY COOKING APPARATUS

[76] Inventor: Harvey O. Toebben, 9925 Stoney Gap Rd., Jefferson City, Mo. 65101

[21] Appl. No.: 09/299,214

[22] Filed: Apr. 23, 1999

[51] Int. Cl.[7] .................................................. A47J 37/04
[52] U.S. Cl. ........................... 99/421 H; 99/427; 99/448; 126/25 AA
[58] Field of Search ................... 99/419, 421 P, 99/421 H, 421 R, 427, 448; 126/25 AA

[56] References Cited

U.S. PATENT DOCUMENTS

| | | |
|---|---|---|
| 693,725 | 2/1902 | Leland . |
| 848,018 | 3/1907 | Engelhard . |
| 904,382 | 11/1908 | Van Patten . |
| 1,666,394 | 4/1928 | Miglin . |
| 2,130,259 | 9/1938 | Bonaguidi ...................................... 53/5 |
| 2,722,882 | 11/1955 | Wilson ...................................... 99/421 |
| 2,811,099 | 10/1957 | McGoldrick .............................. 99/444 |
| 2,846,941 | 8/1958 | Goodwin ................................... 99/340 |
| 3,074,360 | 1/1963 | Vaughan ................................... 107/59 |
| 3,103,161 | 9/1963 | Whitehead ................................ 99/427 |
| 3,379,119 | 4/1968 | Harrill ....................................... 99/421 |
| 3,393,630 | 7/1968 | Pickens .................................... 99/259 |
| 3,566,777 | 3/1971 | Koziol ...................................... 99/427 |
| 3,848,522 | 11/1974 | Trelc ........................................ 99/421 |
| 3,858,495 | 1/1975 | Gotwalt .............................. 99/421 HH |
| 3,866,527 | 2/1975 | Katris ................................... 99/421 H |
| 3,867,877 | 2/1975 | Zajc ......................................... 99/402 |
| 4,158,991 | 6/1979 | Nakashima .............................. 99/421 |
| 4,321,857 | 3/1982 | Best ......................................... 99/340 |
| 4,421,016 | 12/1983 | Sich ......................................... 99/402 |
| 4,729,297 | 3/1988 | Iranzadi ................................... 99/401 |
| 4,867,051 | 9/1989 | Schalk .................................. 99/443 C |
| 5,001,971 | 3/1991 | Beller ....................................... 99/421 |
| 5,058,493 | 10/1991 | Basek et al. ............................. 99/339 |
| 5,168,798 | 12/1992 | Kristofich et al. ....................... 99/421 |
| 5,205,207 | 4/1993 | McGuire .................................. 99/340 |
| 5,473,977 | 12/1995 | Koether et al. ....................... 99/421 P |
| 5,562,022 | 10/1996 | Schmid et al. ....................... 99/421 H |
| 5,649,475 | 7/1997 | Murphy et al. ........................... 99/421 |
| 5,715,744 | 2/1998 | Coutant ................................... 99/421 |

Primary Examiner—Keith D. Hendricks
Assistant Examiner—Drew Becker
Attorney, Agent, or Firm—Richard J. Grundstrom

[57] ABSTRACT

The rotary cooking apparatus of this invention includes a housing with a bottom opening to allow heat and smoke from a heat source into the housing. The bottom opening defines a plane on which the housing can rest upon. The opening is generally sized to fit over a grill or some other heat source. A base such as a boot or plate can also be used between the grill or heat source and the housing. The housing has opposing sidewalls. Bearings or bushings are centrally located and attached to the sidewalls. A pivotal door on the housing allows access into the housing. A rotating center attaching device is rotatably positioned within the housing and within the bearings. A rotatory device, such as a rotisserie motor, rotates the rotating center attaching device. Various types of attachments attach to the rotating center attaching device to cook food in a variety of various rotating cooking methods. The various attachments include, but are not limited to, one or more skewers, a single center shaft or spit, a rotating basket or tray, skewer attaching baskets, one or more pivotal trays or any combination thereof. The rotating central attaching device has a pair of rotating disks, a pair of short rotatable shafts, one for each of the rotatable disks and a center shaft. The short rotatable shafts are center attached to the rotatable disks through a center hole with ends extending from both sides of the disks. The outer ends of the short rotatable shafts are positioned within the bearings. The center shaft is connected to the inner ends of the short rotatable shafts and are used to join the two rotatable disks.

19 Claims, 8 Drawing Sheets

ROTARY COOKING APPARATUS

BACKGROUND OF THE INVENTION

The present invention relates to a rotary cooking apparatus and more particularly to a device that cooks food in a variety of different rotary fashions utilizing various rotating attachments.

There are many different types of rotisserie devices known in the art and available in the market. The most common rotisserie is a simple spit used in conjunction with an electric motor. The spit is positioned above a grill and is turned at a given rate by the motor. The foods are cooked evenly by the foods rotating above the heat. There are several deviations of this simple device also known. Some automatically cook food one way or another. Others combine a number of spits. Still others combine the spit with a variety of different methods of attaching and keeping the foods on the spits.

Another common method of rotational cooking is cooking with skewers. A skewer is nothing more than a small spit upon which food is positioned for rotational cooking. A skewer with cooked food is typically referred to as a kabob. Kabobs can include and do come with a variety of different foods. The skewers are often rotated manually by the hand constantly or frequently turning the skewers. There are also automatic rotary devices for turning skewers. These are similar to the rotation of spits. There are devices for turning a single skewer and devices for rotating a plurality of skewers, just as there is for spits.

Generally rotisseries of the prior art are incorporated with a specific heat source such as a grill or oven. There has not been a rotisserie unit designed for use with virtually any heat source.

Additionally, the prior units typically include only one means of rotational cooking, even thought a variety of different cooking methods are available. There was no means of combining the various rotating cooking methods into a single unit.

Several units of the known prior art used a large number of moving parts to rotate a plurality of spits or skewers. These always created problems and because of the large number of moving parts were often inoperable and expensive to fix.

Accordingly, it is an object of the present invention to provide a rotary cooking apparatus that is adapted to be used with a variety of heat sources. With the rotary cooking apparatus of this invention it has been found that cooking by rotational means can be adapted to gas grills, charcoal grills, smokers, gas burners, electric burners and a number of heat sources. As such, this invention is universally adaptable to virtually any type of heat source as desired.

Another object of the present invention is to provide an improved rotary cooking apparatus that is constructed to provide a variety of rotating cooking methods into a single unit. The rotary cooking apparatus of this invention combines spits, skewers, baskets and trays in a variety of different methods, to provide a means of combining various rotating cooking method into one unit. The various methods can be used individually or in combination with other.

A further object of the present invention is to provide a rotary cooking apparatus that utilizes few moving parts. The rotary cooking apparatus of this invention uses a rotary means which rotates a single center rotating attaching device on which all the various cooking attachments are attached. This minimizes the number of moving parts and decreases break down and expenses.

Still a further object of the present invention is to provide a rotary cooking apparatus adapted for enclosing a variety of rotary cooking methods into an enclosure for rapidly and evenly cooking foods. The rotary cooking apparatus of this invention is characterized by having a central rotating attaching device completely enclosed within an enclosure. Thereby all the various types of rotary cooking methods are enclosed. The enclosure maintains heat and cooks food more evenly, more throughly and quicker than a rotisserie that is open. Additional, less energy is wasted because the heat is retained and less fuel is required.

SUMMARY OF THE INVENTION

The rotary cooking apparatus of this invention is typically used with a heat source to cook food in a variety of rotating cooking fashions. The rotary cooking apparatus typically includes a boot that is sized to cover a heat source; a housing that is attached to and sits on top of the boot; the housing and boot have a bottom opening such that the heat and smoke from the heat source can enter the housing, the housing has opposing sidewalls, bearings or bushings are centrally located on the sidewalls, a pivotal door on the housing allows access into the housing; a rotating center attaching device rotatably positioned within the housing and within the bearings; a rotatory means to rotate the rotating center attaching device; and various types of attachment that attach to the rotating center attaching device. The various attachments include, but are not limited to, one or more skewers, a single center shaft or spit, rotating basket or tray, one or more pivotal trays or any combination thereof.

The rotating central attaching device has a pair of rotating disks, a pair of short rotatable shafts—one for each of the rotatable disks and a center shaft. The short rotatable shafts are center attached to the rotatable disks through a center hole with ends extending from both sides of the disks. An outer end of the short rotatable shafts are positioned within the bearings or bushings. The center shaft is connected to the inner ends of the short rotatable shafts and are used to join the two rotatable disks. The attachments are attached via the center rotating attaching device using various attaching method.

The above mentioned and other objects, and features of the present invention will be better understood and appreciated from the following detailed description of the main embodiment thereof, selected for purposes of illustration and shown in the accompanying drawings.

DETAILED DESCRIPTION

Figure 1:
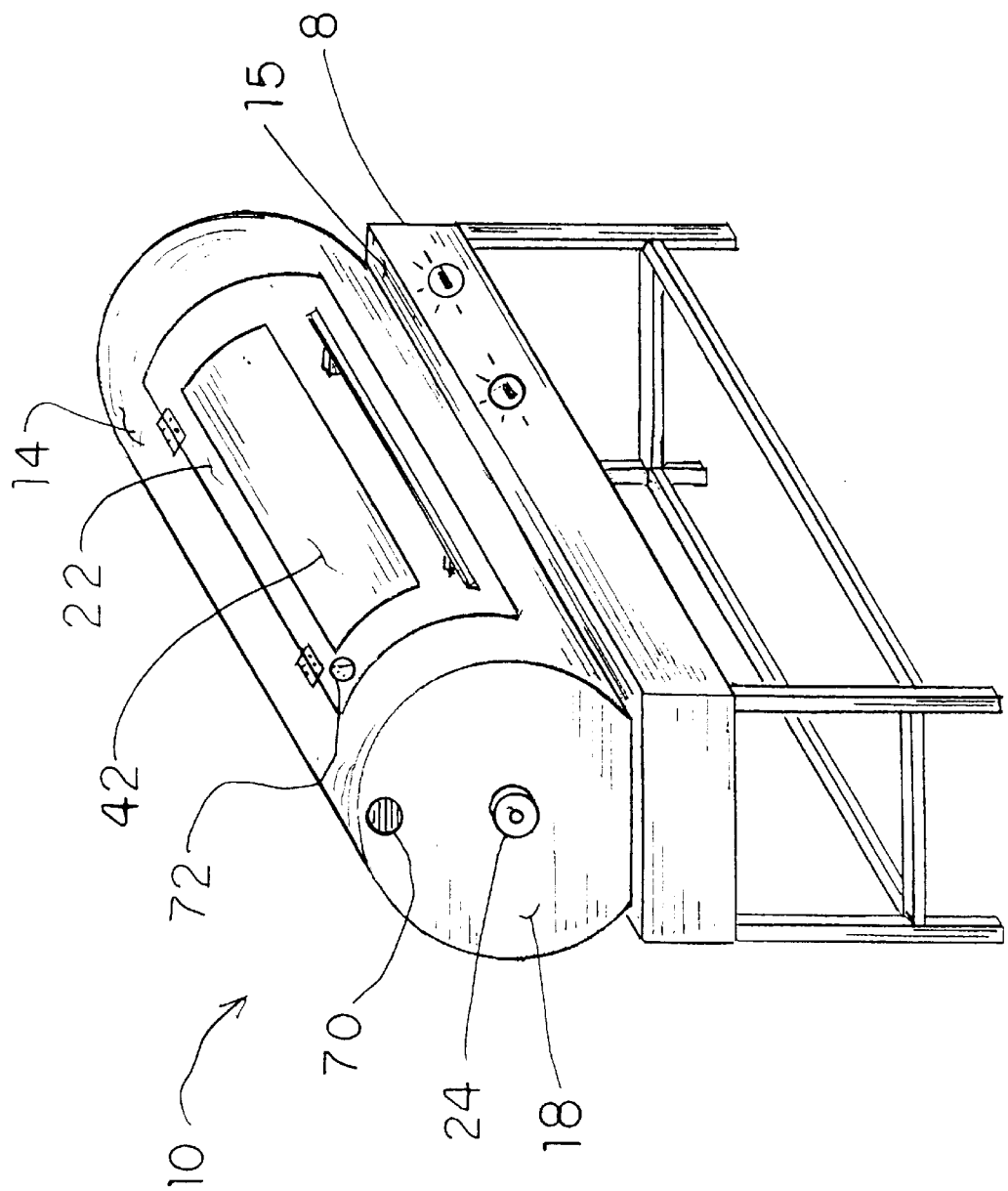
FIG. 1 is a front isometric view of the rotary cooking apparatus showing the housing, heat source and the and plate therebetween.
Figure 6:
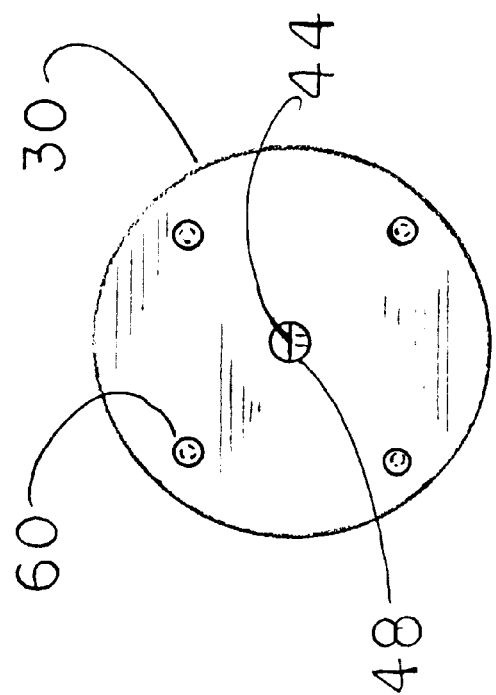
FIG. 6 is an inside side view of a typical rotatable disk.
Figure 2:
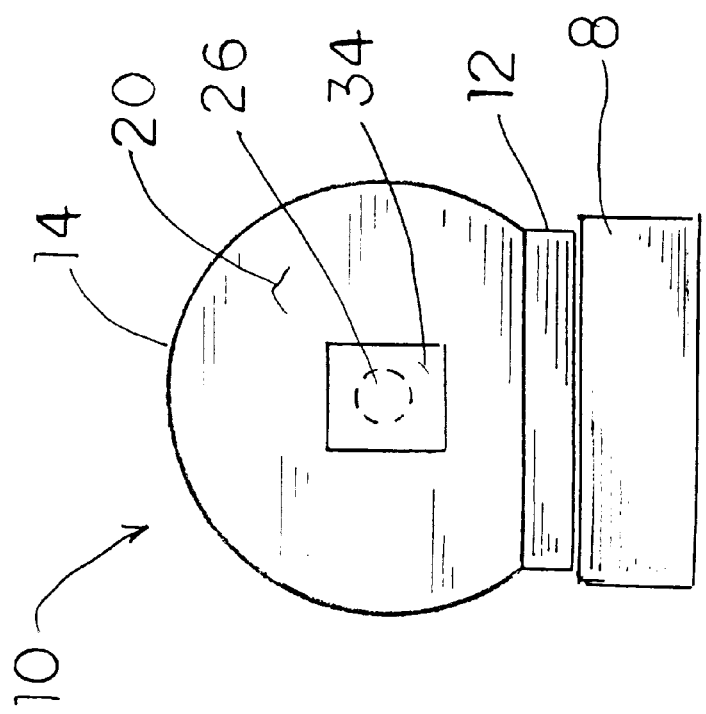
FIG. 2 is an end view of the housing of the rotary cooking apparatus, showing one location of the rotaty means.
Figure 3:
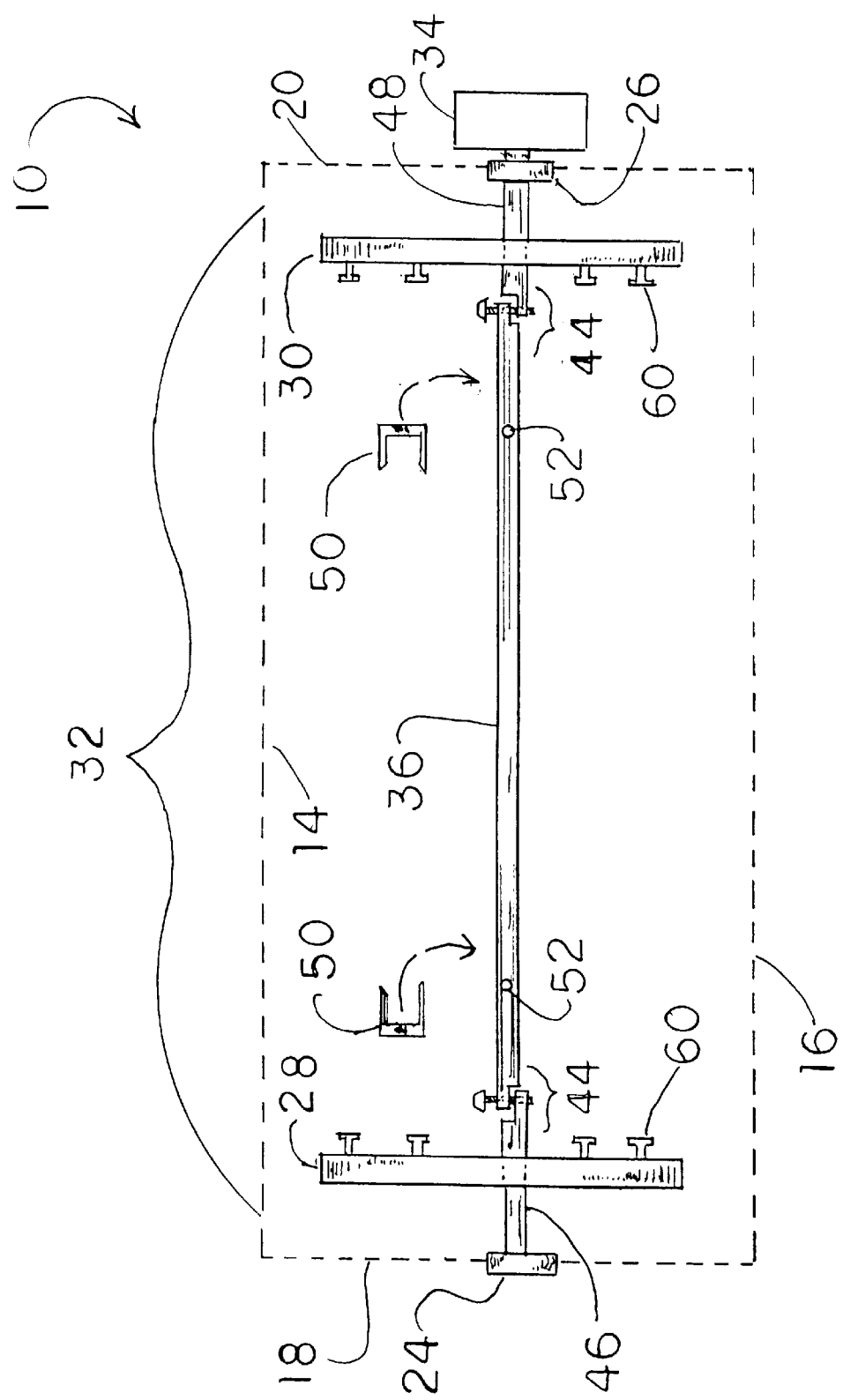
FIG. 3 is a front view showing the arrangement of the center rotating attaching device including the rotatable disks, center shaft, bearings and rotary means within the housing of the rotary cooking apparatus.

Referring now to the drawings in general there is shown a rotary cooking apparatus of this invention in its perferred embodiment and best mode contemplated.

This invention is a rotary cooking apparatus 10 and more specifically, an apparatus that has many features for cooking in a variety of rotary fashions with a variety of cooking attachments.

The rotary cooking apparatus 10 of this invention, in a basic description, starts with a housing 14. The housing 14 has a bottom opening 16 such that the heat and smoke from the heat source 8 can enter the housing 14. The bottom opening 16 defines a rectangular plane which can fit atop a grill or other heat source. The bottom opening 16 could also be attached to a boot 12, or the housing with the bottom opening 16 could be sat upon a plate 15.

The housing 14 has side walls 18 and 20, one on each side of the housing 14. A door 22 allows access into the housing 14. There are bearings or bushings 24 and 26 centrally located on each of the sidewalls 18 and 20. A pair of rotatable disks 28 and 30 are rotatably mounted to each of the bearings or bushings 24 and 26. A central rotatable attaching device 32 rotates within and between the bushings 24 and 26. Various types of attachments fit between the rotatable disks 28 and 30. The rotatable disks 28 and 30 and the central rotatable attaching device 32 therebetween are rotated by a rotary means 34, such as a rotisserie motor, on the outside of the housing.

The attachments could be as simple as a single skewer or center shaft 36, one or more skewers attached to an outer perimeter of the rotatable disks 28 and 30, a tray or basket 38 fixed to the center shaft 36, one or more pivotal trays 40 rotatably attached between rotable disks 28 and 30 or various combinations of the various cooking attachments, or any combination. The various attachments are connected or attached to the rotatable disks 28 and 30 by variety of quick disconnect means. Using the various attachment means or quick disconnect means, the attachments can be easily installed and removed from the housing 14. Typically, all attachments and food thereon can be installed within the housing and removed through door 22.

The preferred embodiment and the best mode contemplated of the rotary cooking apparatus of the present invention are herein described. However, it should be understood that the best mode for carrying out the invention hereinafter described is offered by way of illustration and not by the way of limitation. It is intended that the scope of the invention include all modifications which incorporate its principal design features.

The rotary cooking apparatus 10 of this invention is designed to be used with a variety of different heat sources 8. The heat source could be a gas grill (as shown), charcoal grill, electric heating elements, gas burner, stove, smoker, or any other heat source, smoke source or combination thereof. Typically, the heat source is a type of heating source that is used for cooking, but not necessarily. This invention would also function over practically any type of heating source, including heat sources such a fire and/or coals. The preferred method of use is in combination with a gas grill, such as used with outdoor barbecues. But the invention also functions very well with charcoal grills and smokers.

A housing 14 sits on top of the heat source and as the name implies, is an enclosure in which foods are cooked. The housing 14 has a bottom opening 16. The bottom opening 16 defines a plane on the bottom of the housing 14. Heat and smoke from the heat source 8 is provided through this opening 16. The housing 14, in the preferred embodiment, is cylindrical in shape and made of steel or other compatible metal or material. Rectangular and other shaped housing would work, but it has been demonstrated that there is better control of heat and less wasted volume with a cylindrical housing.

The housing can be sat directly upon the heat source 8 or it can be used in conjunction with a base such as a boot 12 or plate 15. The base will generally support the housing 14 over the heat source 8. The boot 12 is generally a frame like device, in the same shape as the bottom opening 16, and generally a couple inches in height. The specific application would determine the exact shape and size. Typically, the boot 12 is made of steel or other type of metal that can easily withstand the heat produced by grills and other heat sources. The boot 12, in the preferred embodiment such as with a gas grill, fits upon the top of the body of the gas grill. The grill rack may be left in or removed from the gas grill, as desired or as determined by the particular gas grill or heat source 8 being used. Ideally, there should be little or no space between the outside surface of the bottom edge of the boot 12 and the inside top surface of the gas grill body. This helps to ensure a good fit and to ensure best control of the heat within the rotary cooking apparatus 10. If there were large spaces, large quantities of heat or smoke would escape and it would be more difficult to control temperatures within the housing 14, as well as making an uncomfortable cooking environment for the user. The boot 12, as currently perceived, would be available in three to five different sizes. These sizes fit the majority of gas grills presently on the market and a large number of charcoal grills. Special sizes would be made available upon request, with dimensions specific to the application.

The housing 14 could also be sat upon a plate 15. The plate 15, is typicaly a sheet of metal with a lip 17 around the perimeter. The inside area 21 of the plate 15, in the preferred embodiment tappers to an opening or drain 19. In the preferred embodiment, the drain is center located, but it could also be moved to one side if desired. The plate 15 sits upon the heat source 8 and the housing 14 sits upon the plate 15. Thereby, the plate 15 supports the housing above the heat source. Idealy, the plate 15 should cover the entire top area of the grill or heat source 8, with open spaces. This prevent wasting heat and help keep heat and smoke away from the operator. The plate also helps to prevent flare ups due to the juices dripping onto the heat source. The lip 17 and the tappered inside area directs liquids to the drain for collection. The plate could also function as a grill, if desired.

The housing 14 has sidewalls 18 and 20. The sidewalls 18 and 20 are on opposing sides of the housing 14 and are generally parallel to each other. A door 22 is provided to allow access into housing 14. The door 22 is typically pivotally attached with hinges, but other provisions could also be used. One or more windows 42 could also be provided to enable viewing into the housing 14. The window 42, in the preferred embodiment, is located on the door 22. However, windows 42 could be added elsewhere on the housing 14, as desired. The window 42 would be obviously made with heat tempered and heat resistant glass.

Each of the sidewalls 18 and 20 have a bearing or bushing 24 and 26. The bearings or bushings 24 and 26 are centrally located and attached on each of the sidewalls 18 and 20. Bushing and bearings, for the purpose of this description, are interchangeable. Either one would function properly.

Therefore, for brevity purposes only and for this description, bearings will be used as a generic term meaning one, the other or both.

The bearing 24 and 26 provide a means for the central rotating attaching device 32 and the various cooking attachments to rotate within the housing 14. As such and as known, each of the bearings 24 and 26 have a center hole for receiving a shaft. The hole in one bearing, the other, or perhaps both, is/are configured such that a shaft can extend outward through the sidewall 20 for attachment to a rotary means 34. The bearings 24 and 26 can be attached to either the outside surface or the inside surface of the sidewalls 18 and 20. If located on the outside the bearings 24 and 26 would be removed from the inside of the housing 14 and thus away from the heat. This could be desirable for the longevity of the bearings 24 and 26. In either case, holes would be located through the sidewalls as appropriate for a shaft.

The central rotatable attaching device 32 is located within the housing and is rotatable by installation within the bearings 24 and 25. The central rotatable attaching device 32 has a pair of rotatable disks 28 and 30, a central shaft 36, and two short rotatable shafts 46 and 48.

The pair of rotatable disks 28 and 30 are rotatably mounted to each of the bearings or bushings 24 and 26 via the short rotatable shafts 46 and 48. Typically, the rotatable disks 28 and 30 are made with plate steel, aluminum, or other suitable metal or material. The disks 28 and 30 are round, as the name implies. The thickness and diameter are determined by the particular application. However, the preferred embodiment, disks 28 and 30 have a thickness of approximately three sixteenths ($3/16$) of an inch and a diameter of approximately sixteen (16) inches. Other dimensions would also be appropriate depending on the overall size of the rotary cooking apparatus 10 and the housing 14.

The short rotatable shaft 46 and 48 are installed through the center of the rotatable disks 28 and 30 and fixed such that as the shafts 46 and 48 rotate, the rotatable disks 28 and 30 rotate. An outer end of the short rotatable shafts 46 and 48 extend through the bearings 24 and 26 and provides the means for the rotatable disks to rotate therein. The inside end of the short rotatable shafts 46 and 48 have a quick attachment means 44 for general attachment of a center shaft 36. The preferred embodiment, the inside ends of shafts 46 and 48 are half round or contain a centered flat region. The ends of the center shaft 36 are then also half round to mate against the half round ends on the short shafts 36 and 48. A thumb bolt is then screwed through an opening on the ends of the center shaft 36 and into threaded bores on the short shafts 46 and 48. This provides a very secure means of attachment of the center shaft 36 and joins the rotatable disks 28 and 30.

The center shaft 36 provides the means of transferring the rotational energy from the rotary means 34 from one rotatable disk to the other. The center shaft 36 also functions as a spit or skewer on which foods can be cooked. Skewer forks 50 are provided, which fit on the center shaft 36. The skewer forks 50 are positioned and locked on the center shaft 36 with the forks 50 being embedded into the foods. This prevents the cooking food from rotating on the center shaft 36 as the center shaft 36 rotates. The center shaft 36 also serves as a support for a centrally located rotatable cooking basket 38 or tray. This will be later described.

The disks 28 and 30 in conjunction with the center shaft 36 provide the primary means for the various attachments to be attached in a rotatable fashion. All of the various types of attachments fit between the rotatable disks 28 and 30 one way or the other. Since several different attachments can be used, there are a variety of features found on rotatable disks 28 and 30. The first such feature is the inside end of the short shafts 48 and 48 as discussed above. This provides a means of attaching the center shaft 36. The other means of attaching the attachments will be explained as the attachments are explained.

A rotary means 34 is positioned on the outside of the housing 14. The rotary means 34 will be positioned and arranged such that one of the outer ends of the short rotatable shafts 46 or 48 can be rotated by the rotary means 34. Several different arrangements can be effectively used, as desired. The simplest means is the use of an electric rotisserie motor (also indicated by reference numeral 34) commonly available on the market. The rotisserie motor 34 would simply be attached to the outside surface of the sidewall 28 or 30 with the end of the short rotatable shaft 46 or 48 engaging the motor drive. Another arrangement is the use of a motor with pulleys or sprockets. This is not specifically shown, but is generally known in the art and the drawings of such is not needed to understand the concept or the means to produce or make this feature.

A drive pulley or sprocket would be on the motor shaft and a second pulley or sprocket would be on the outer end of one of the short rotatable shafts 28 or 30. A belt or chain would then be installed between the pulleys or sprockets. This method is desirable in some instances. Using this method there is a greater control on rotational speed and more power available. Pulley or gear ratios can be easily changed by changing pulleys or sprockets. In addition, variable speed motors are also available. The principal feature of the rotary means 34 is to provide the needed rotational energy. As such, any means that provides the needed rotational energy would be considered within the scope and spirit of this invention.

The rotary means 34 idealy should have some sort of brake or holding means. Again this is not shown or illustrated, and is not necessary to understand the concept. This feature is desirable to hold and to prevent rotation of the rotatable disks 28 and 30 while installing or removing any attachments, with or without food.

The attachments could be as simple as a single skewer or spit via the use of the center shaft 36 and forks 50. One or more skewers could be attached between and connected to an outer perimeter of the rotatable disks 28 and 30 via a series of clips or recievers designed to receive the ends of the skewers. The clips would be installed along the outer perimeter of the inside edge of the rotatable disks to allow the skewers to be easily attached and removed. The skewers would then rotate with the rotatable disks 28 and 30. Typically, skewers are used for cooking meats, vegetable and other foods and are generally known as a kabob when cooked in this fashion. A drawing is not provided for this feature. Skewers are generally known in the art and a drawing would not be needed to understand a skewer nor a clip attachable to an outer edge of the rotatable disks.

Figure 8:
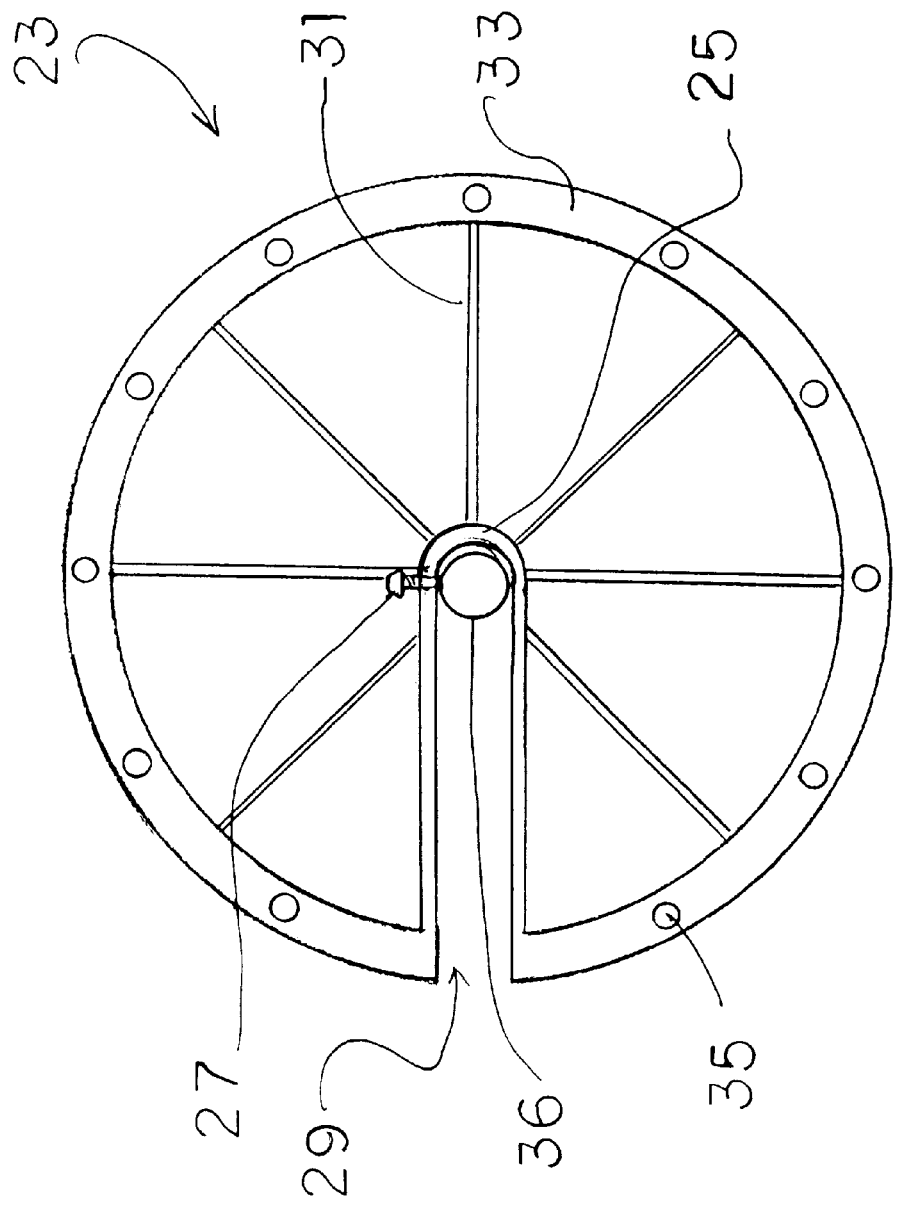
FIG. 8 is a view of a typical skewer attaching basket.
Figure 9:
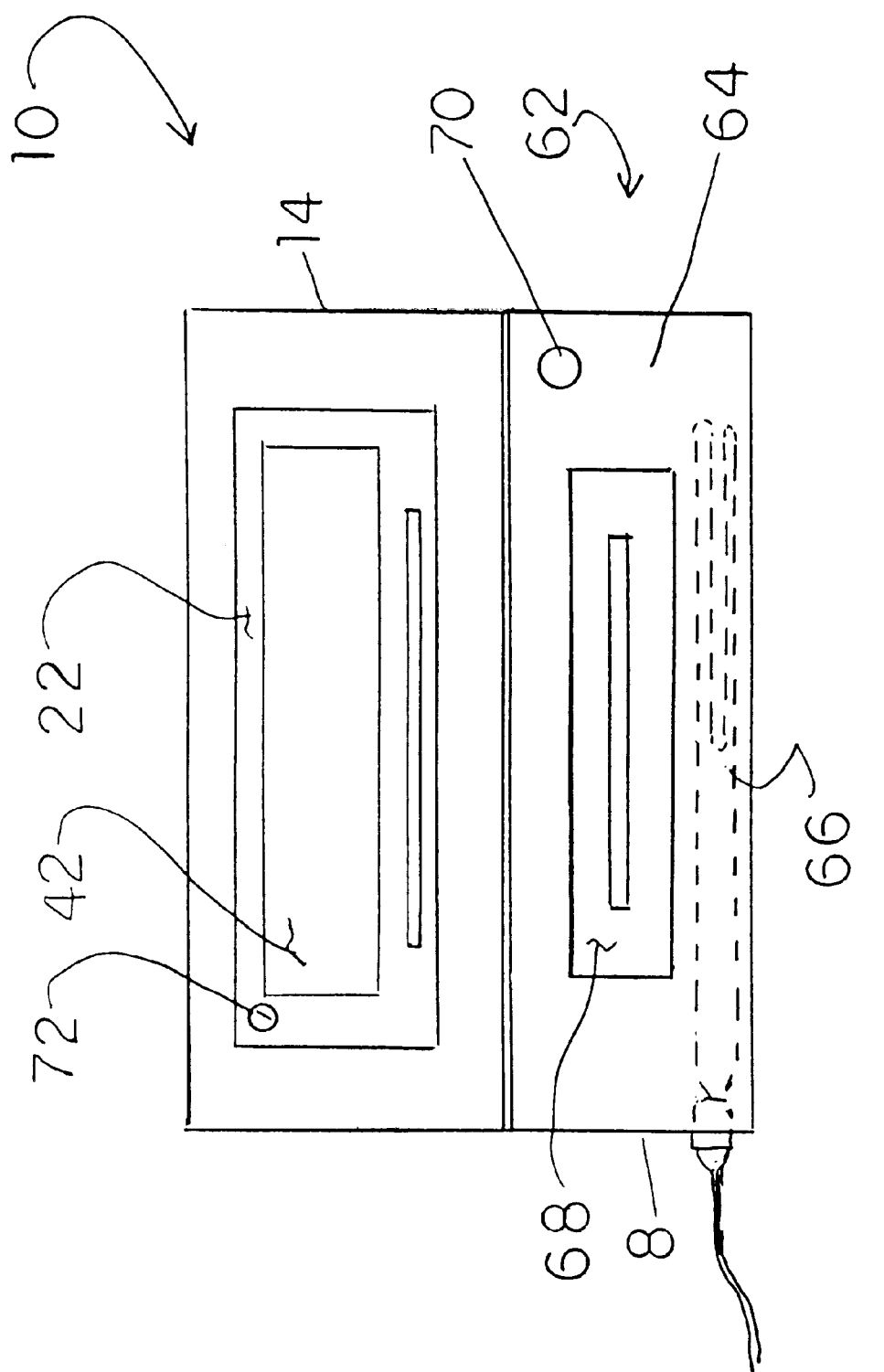
FIG. 9 shows an electric smoker being used with the rotary cooking apparatus of this invention.

A skewer attaching basket 23 is also provided, shown on FIG. 8. The skewer attaching basket 23 is typically mounted to and attached to the center shaft 36. The skewer attaching basket 23 has a center hub 25 with a locking bolt 27. A slot 29 allows the skewer attaching basket 23 to slip over the center shaft 36 to position the center shaft 36 within the hub 25. A wire frame 31, or equivelant, supports an outer ring 33. The outer ring 33 has a plurality of bores or openings 35 for receiveing a plurality of skewers. Typically two skewer attaching baskets 23 would be used. One skewer attaching basket 23 would be attached to the center shaft. Another skewer attaching basket would then be positioned on the center shaft 36 and slid into a position to hold a skewer or skewers between the two skewer attaching baskets 23. Alternatively, one skewer attaching basket could be used in conjunction with one of the rotating disks 28 or 30. Either option functions very well.

Figure 5:
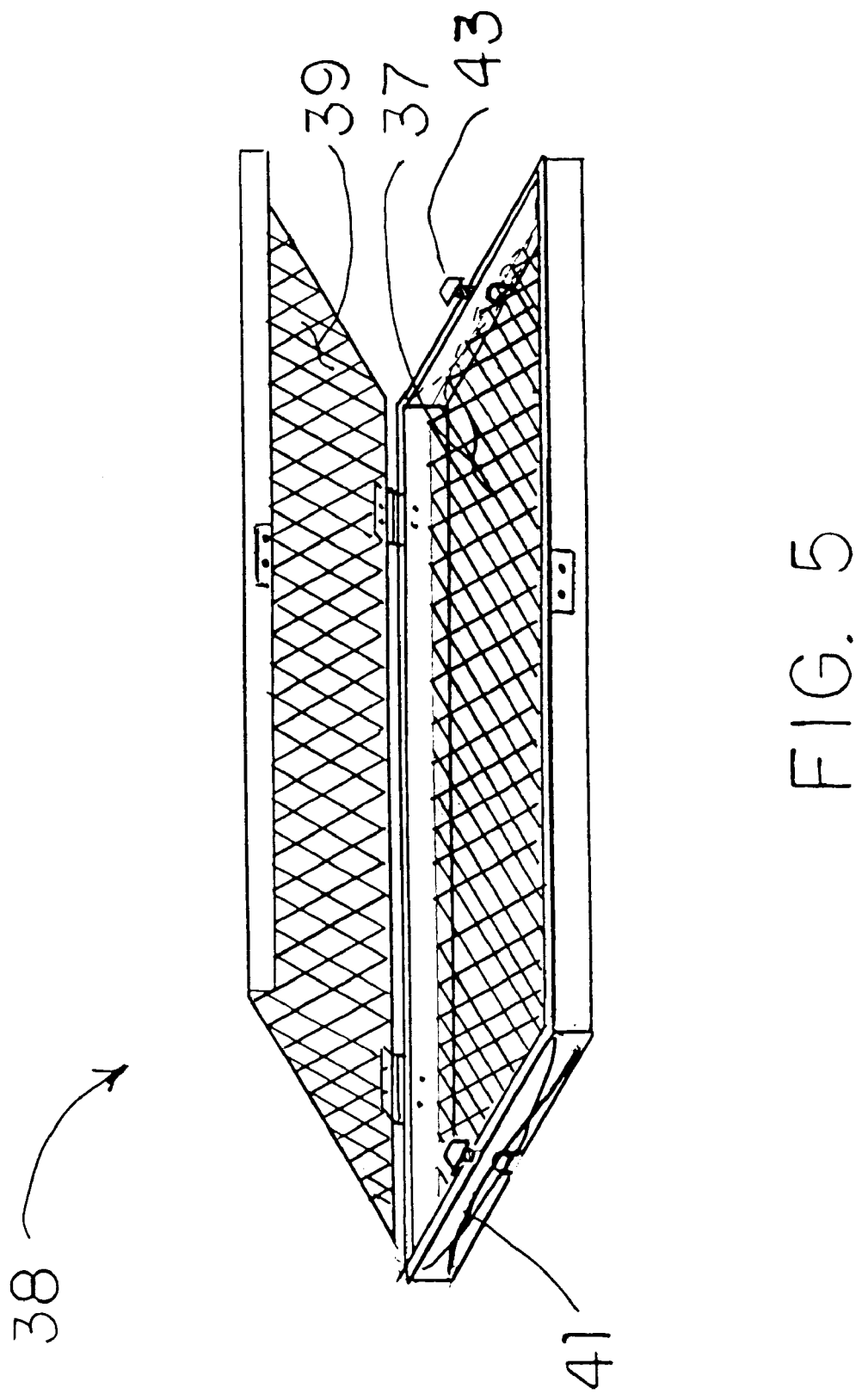
FIG. 5 is a representation of a rotatable tray which is one attachment that attaches to the center shaft of the center rotating attaching device.
Figure 7:
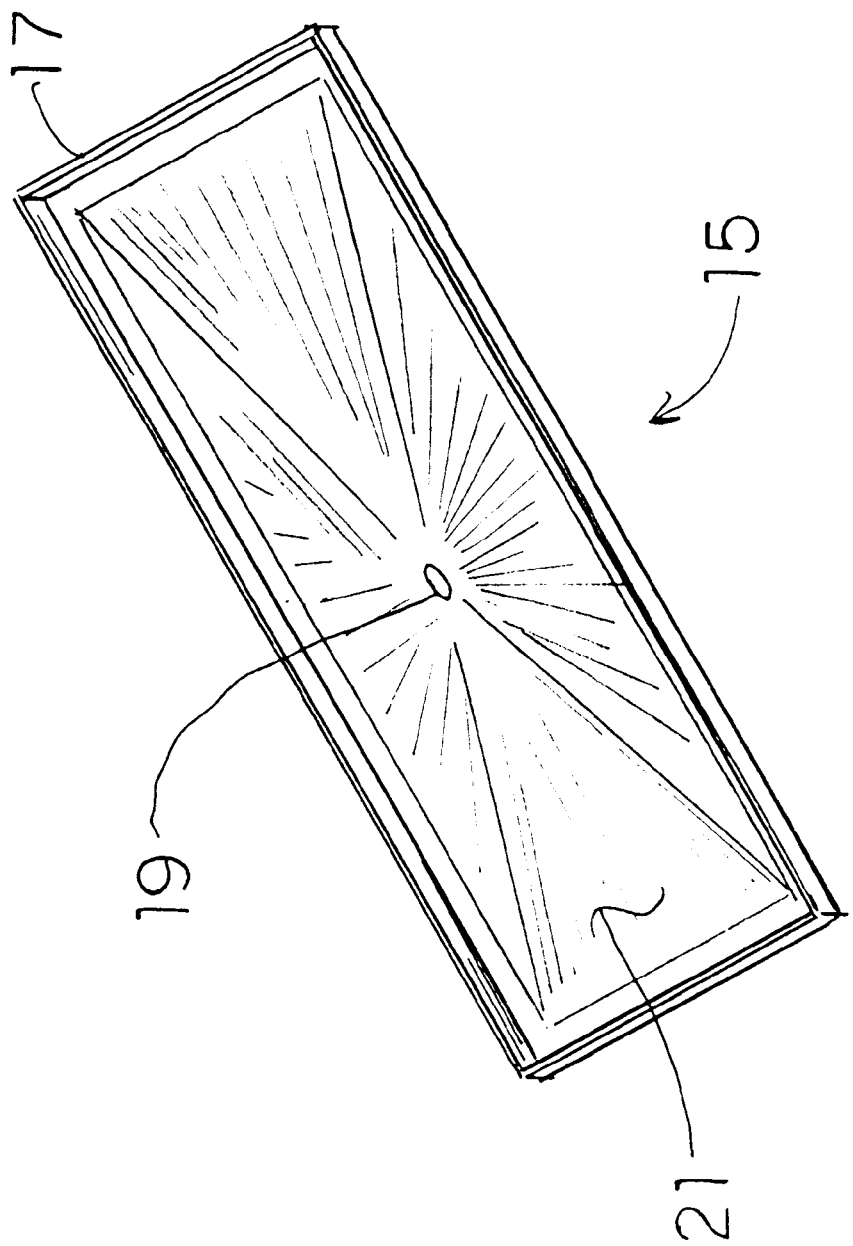
FIG. 7 is an isometric view of a plate which may be used between the housing and the heat source.

A rotatable tray or basket 38, FIG. 5, can be attached to the center shaft 36. This attachment consists of a rectangular wire basket 37 with a closable wire lid 39 and means for attaching to the center shaft 36. Meats or other foods would be placed in the basket. The rotatable tray 38 would then be installed on the center shaft 36, which is presently not installed within the center rotating attaching device 32. Spring clamps 41 within the rotating tray 38 hold the rotating basket on the center shaft 36. Thumb bolts 43 may be used to securely hold the rotating tray 38 on the center shaft and to prevent its rotation in respect to the shaft. Threaded bores 52 may be provided on the center shaft 36 for the receiving the thumb bolts 43. The idea is that the rotating tray 38 rotates with the center shaft 36 and does not rotate in respect to the center shaft 36. The wire lid is closed and locked so the foods therein will not fall out as the rotating tray 38 rotates. The combined rotating tray 38 and center shaft 36 are then installed on the inside ends of the short rotating shafts 46 and 48 as described above. In this manner, foods will be rotated and cooked within the center of the housing 14.

Figure 4:
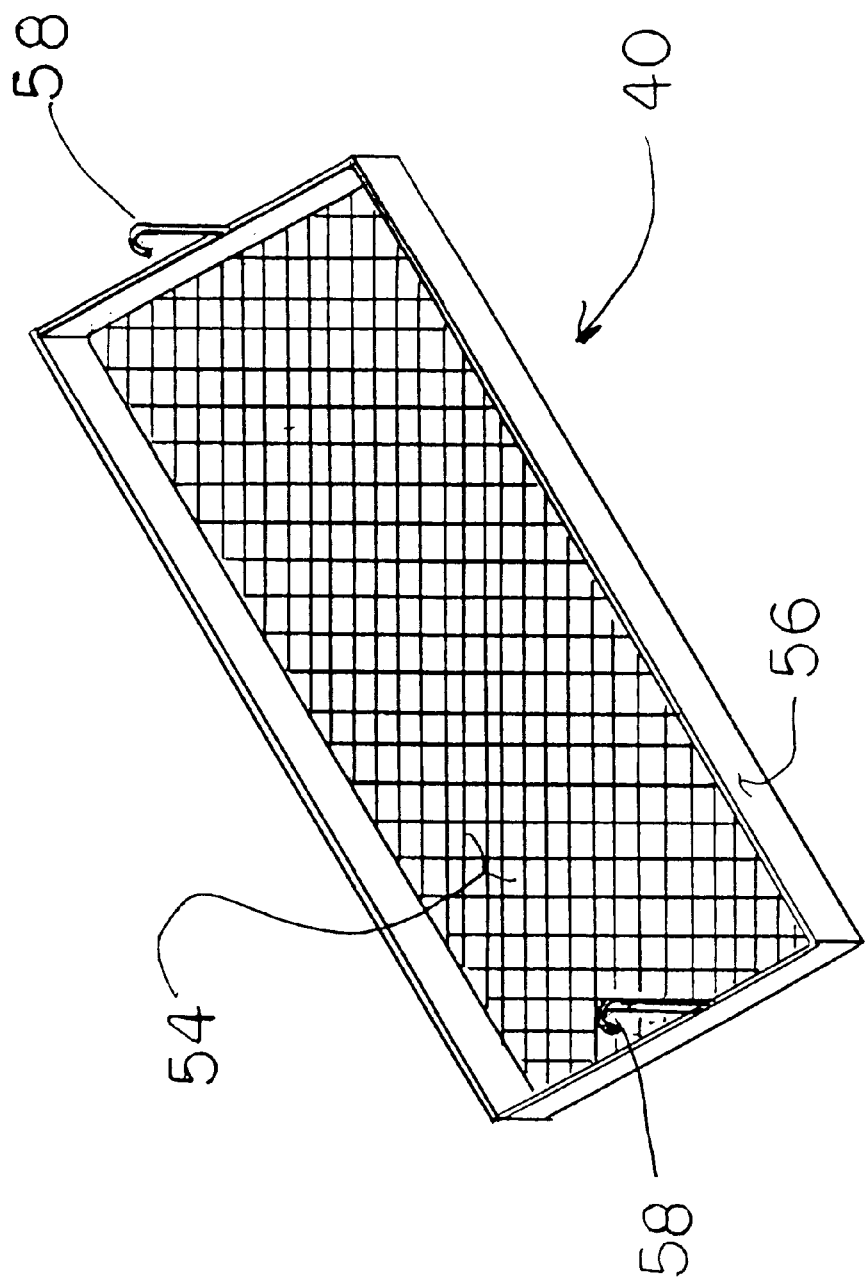
FIG. 4 is a representation of one pivotal tray which is one of the attachments attachable within the center rotating attaching device.

A principle attachment, subject of this invention, is one or more pivotal trays 40, FIG. 4, being rotatably attached between the rotable disks 28 and 30. The pivotal trays 40 generally consist of a rectangular tray 54 with a wire screen or grill mesh like bottom. Side edges or walls 56 extend upward approximately one inch along the entire outer perimeter of the tray 54. Rotation hooks 58 are attached to and extend upward from the side edges 56 along the short sides of the rectangular shape.

A series of side pins 60 are located along an arc approximately one inch inward from the outer perimeter on the inside surface of the rotatable disks 28 and 30. The side pins 60 are simply round metal pins with a head on the outer end permanently attached to the inside surface of the rotatable disks 28 and 30. The side pins 60 receive the rotation hooks 58 on the pivotal trays 40. The pivotal trays 40 are suspended from the side pins 60 via the rotation hooks 58 and can freely pivot on the side pins 60.

In this manner, as the rotating disks 28 and 30 rotate, the pivotal trays 40 pivot on the side pins 60. This keeps the bottom surface of the pivotal trays 40 facing downward, towards the heat source, during the full rotation of the rotatable disks 28 and 30. Meats and other foods are throughly cooked by the higher temperatures near the top of the housing 14 and the top of the rotation of the rotatable disks 28 and 30, and by the direct heat being given off by heat source 8 during the bottom of the rotation of the rotatable disks 28 and 30. One or more pivotal trays could be used as desired.

The various attachments can be combined and used as desired and in accordance with what is being coked. A couple skewers in combination with one or two pivotal trays 40 is a typical combination. The center shaft 36 in combination with the forks 50 and used in conjunction with one or more skewers and a pivotal tray 40 could also be used. The unique feature is that these attachments can be mixed and combined as the cooking needs dictate.

A number of other features and options are also available and can be included or excluded as desired. This could include but is not limited to an electric smoker 62, vents 70, an internal light, electric controls, and clean out drawers.

An electric smoker 62 is an optional feature that can be added under or within a lower portion of the housing 14. The electric smoker 62 provides a means of adding a smoked flavor to the foods being cooked. Foods could also be totally smoked without a typical heat source 8, if desired. As such, the electric smoker 62 functions as the heat source 8. A secondary housing 64 may be provided below the housing 14 or this provision could be incorporated within the boot 12 or within a lower portion of the housing 14. The boot 12, if included therein, would, of course, have to be modified in size and features to incorporate the electric smoker 62. An electric heating element 66 incorporated within a secondary housing 64 provides the needed heat. An access door 68 would allow wood chips to be loaded over the electric element 66. An internal screen or wire mess would be utilized directly above the heating element 66 to receive the chip.

The housing could also contain one or more vents 70 to release and control heat within the housing 14. The vents 70 could be located anywhere on the housing 14. Typically, a vent would be provided near the top of one of the sidewalls 18 or 20.

A thermometer 72 could also be included for monitoring and maintaining a desired temperature within the housing. The thermometer 72 could be located in any convenient location on the housing. As illustrated, the thermometer 72 is positioned and mounted on the door 22, as an example only. This location is also considered the preferred embodiment.

An internal light could also be provided. This would be similar to an oven light which is commonly known in the art. As such there is no specific drawing of this feature. As with any electric light there would have to be a switch. The switch would be conveniently located.

Other electric controls could also be added or included as needed or desired. This could include things such as the light switch discussed above, a motor control switch, a motor speed control switch if a variable speed motor were used, and controls for the electric smoker 62.

Having described the invention in detail, those skilled in the art will appreciate that modifications may be made of the invention without departing from the spirit of the inventive concept herein described.

Therefore, it is not intended that the scope of the invention be limited to the specific and preferred embodiments illustrated and described. Rather, it is intended that the appended claims and their equivalents determine the scope of the invention.

What is claimed is:

1. A rotary cooking apparatus comprising:

a housing having a bottom opening, said bottom opening defining a plane on which said housing sits, over a heat source, said housing having opposing sidewalls and a door to allow access into said housing;

bearings, said bearings being centerly attached to said sidewalls, with one bearing on each of said sidewalls;

a center rotating attaching device contained within said housing and rotatably attached between said bearings, said center rotating attaching device having a pair of rotatable disks each being attached to a short rotatable shaft, said short rotatable shafts extending into said bearings on opposite sides within said housing, an inside end of each of said short shafts having a quick connect for attachment of a center shaft, said center shaft being a spit;

a rotating means, said rotating means providing a means to rotate said center rotating attaching device, said rotating means attached to an outer end of one of said short shafts extending outward from one of said bearings and said housing, said center shaft transferring rotational movement from one of said short shafts, and said rotatable disks attached thereto, to the other one of said short shafts, and said rotatable disk attached thereto;

a plurality of attachment means contained on said rotatable disks, said attachment means comprising a plurality of skewer clips or receivers, a plurality of side pins for receiving pivotal trays, and bores; and a plurality of different attachments attachable to said attachment means on said rotatable disks for cooking foods in a variety of rotatable cooking methods.

2. The rotary cooking apparatus as set forth in claim 1 further comprising a boot, said boot being a frame like structure attachable to said housing surrounding and extending from said bottom opening and sized to fit onto and enclose a top opening of the heat source.

3. The rotary cooking apparatus as set forth in claim 1 further comprising a plate, said plate sized to fit over and cover the heat source, having an upward extending lip along its outer perimeter and a tapered inside area which tapers to a center opening or drain, said plane of said bottom opening on said housing resting upon a top surface of said plate.

4. The rotary cooking apparatus as set forth in claim 1 in which said heat source is selected from the group consisting of: a gas grill, charcoal grill, smoker, gas burner, stove, oven, fire, coals, electric heating element, and electric burner.

5. The rotary cooking apparatus as set forth in claim 1 in which said housing is cylindrical in shape.

6. The rotary cooking apparatus as set forth in claim 1 in which said attachments further comprise at least one of the following: one or more skewers, one or more rotating trays, one or more pivotal trays, or any combination thereof.

7. The rotary cooking apparatus as set forth in claim 1 further comprising an electric smoker, said electric smoker positioned in a lower portion of said housing.

8. The rotary cooking apparatus as set forth in claim 1 further comprising an internal light with an external light switch.

9. The rotary cooking apparatus as set forth in claim 1 further comprising a window, said window positioned on said housing or on said door to allow viewing into said housing.

10. The rotary cooking apparatus as set forth in claim 1 in which one of said attachments comprise one or more pivotal trays, each of said pivotal tray comprising a rectangular tray having a wire screen or mesh like bottom, side edges or walls extending upward along the entire outer perimeter of said tray, rotation hooks attached to and extending upward from said side walls, along short sides of said rectangular shaped tray; and said attachment means for attaching said pivotal trays to said center rotating attaching device comprising said side pins, said side pins consisting of pins with heads attached within said center rotating attaching device and pivotally receiving said rotation hooks on said pivotal tray, such that said pivotal tray is pivotally attached within said center rotating attaching device.

11. The rotary cooking apparatus as set forth in claim 1 in which one of said attachments comprise a skewer attaching basket, said skewer attaching basket attachable to said center shaft, said skewer attaching basket having a center hub with an outward extending frame, an outer ring at the outer ends of said frame, and a plurality of skewer bores for receiving one or more skewers along said outer ring.

12. A rotary cooking apparatus comprising:

a housing, said housing having a bottom opening extending through a bottom of said housing, said bottom opening defining a plane on which said housing sits, said housing having opposing sidewalls and a door to allow access into said housing;

bearings, said bearings being attached to said sidewalls, with one bearing on each of said sidewalls;

a center rotating attaching device contained within said housing; said center rotating device comprising a pair of short rotatable shafts, outer ends of said short rotatable shafts installed and rotatable within said bearings, a pair of rotatable disks attached onto said short rotatable shafts within said housing, a quick disconnect on an inner end of said short rotatable shafts and a removable center shaft attached to said quick disconnect and extending between and joining said rotatable disks, said center shaft being a spit;

a rotating means, said rotating means attached to an outer end of one of said short rotatable shafts and providing a means to rotate said center rotating attaching device;

a plurality of attachment means contained on said center rotating attaching device; and a plurality of different attachments attachable to said attachment means on said center rotating attaching device for cooking foods in a variety of rotatable cooking methods.

13. The rotary cooking apparatus as set forth in claim 12 in which one of said attachments further comprise one or more pivotal trays, each of said pivotal trays comprising a rectangular tray having a wire screen or mesh-like bottom, having side edges or walls which extend upward along an outer perimeter of said tray, rotation hooks attached to and extending upward from said side wall along short sides of said rectangular shaped tray, and said attachment means for attaching said pivotal trays to said center rotating attaching device comprising side pins, said side pins consisting of pins with heads attached along an arc on an inside surface near an outer perimeter of said rotatable disks and pivotally receiving said rotation hooks on said pivotal tray, such a that said pivotal tray is pivotally attached between said rotatable disks and within said center rotating attaching device.

14. The rotary cooking apparatus as set forth in claim 12 in which one of said attachments further comprise a skewer attaching basket, said skewer attaching basket attachable to said center shaft, said skewer attaching basket having a center hub with an outward extending frame, an outer ring at the outer ends of said frame, and a plurality of skewer bores for receiving one or more skewers along said outer ring.

15. The rotary cooking apparatus as set forth in claim 12 in which said rotating means comprises a rotisserie motor attached to an outer end of one of said short rotatable shafts.

16. The rotary cooking apparatus as set forth in claim 12 in which said rotating means comprises a motor with a) pulleys or sprockets and b) belts or chains, one of said pulleys or sprockets attached to an outer end of one of said short rotatable shafts, another one of said pulleys or sprockets attached to a motor shaft extending from a motor, and said belts or chains rotatably connecting said pulleys or said sprockets to provide a means of rotating said center rotatable attaching device.

17. The rotary cooking apparatus as set forth in claim 12 further comprising a vent, said vent providing a means to assist in controlling heat within said housing.

18. A rotary cooking apparatus comprising:

a housing having a bottom opening extending through a bottom of said housing and defining a plane on which said housing sits, said housing having opposing sidewalls, a door to allow access into said housing and a window to allow viewing into said housing, said bottom opening being open to a heat source to allow heat and smoke into said housing to cook foods therein;

bearings, said bearings being attached to said sidewalls, with one bearing on each of said sidewalls;

a center rotating attaching device contained within said housing; said center rotating device comprising a pair of short rotatable shafts, outer ends of said short rotatable shafts installed and rotatable within said bearings, a pair of rotatable disks attached onto said short rotatable shafts, and a removable center shaft attached to and extending between and joining said rotatable disks;

a rotating means, said rotating means attached to an outer end of one of said short rotatable shafts and providing a means to rotate said center rotating attaching device;

a plurality of attachment means contained on said center rotating attaching device; one of said attachments means comprising side pins, said side pins consisting of pins with heads attached along an arc on an inside surface near an outer perimeter of said rotatable disks; and a plurality of different attachments attachable to said attachment means on said center rotating attaching device for cooking foods in a variety of rotatable cooking methods; one of said attachments comprising one or more pivotal trays, each of said pivotal trays comprising a rectangular tray having a wire screen or mesh-like bottom, further having side edges or walls which extend upward along an outer perimeter of said tray, rotation hooks attached to and extending upward from said side wall along short sides of said rectangular shaped tray, said rotational hooks engaging said side pins on said rotatable disks such that said pivotal tray is pivotally attached between said rotatable disks and within said center rotating attaching device.

19. The rotary cooking apparatus as set forth in claim 18 further comprising a base for said housing, said base comprising either a boot consisting of a frame like structure attached to a bottom of said housing along a perimeter of said bottom opening, or consisting of a plate like structure having a lip extending upward along an entire outer perimeter of said plate like structure and having a tapered inside area that tapers to a drain or opening, said base sitting over said heat source and supporting said housing.

* * * * *